United States Patent
Ringwall

[15] 3,672,235
[45] June 27, 1972

[54] FLUIDIC AXIS POSITION SENSOR FOR ROTATING MASS

[72] Inventor: Carl G. Ringwall, Scotia, N.Y.
[73] Assignee: General Electric Company
[22] Filed: Feb. 18, 1970
[21] Appl. No.: 12,241

[52] U.S. Cl..................................................74/5.6, 74/5.7
[51] Int. Cl.......................................................G01c 19/28
[58] Field of Search....................74/5, 5.43, 5.6, 5.7; 73/515

[56] References Cited

UNITED STATES PATENTS

| | | | |
|---|---|---|---|
| 3,267,747 | 8/1966 | Paine | 74/5.6 X |
| 3,311,987 | 4/1967 | Blazek | 74/5.6 X |
| 3,362,233 | 1/1968 | Posingies | 74/5.6 |
| 3,528,300 | 9/1970 | Paine | 74/5.7 |

Primary Examiner—Manuel A. Antonakas
Attorney—Frank L. Neuhauser, Oscar B. Waddell, Joseph B. Forman, David M. Schiller and Arthur E. Fournier

[57] ABSTRACT

A fluidic axis position sensor is disclosed wherein the axis of rotation of a rotating mass may be determined by sensing irregularities on the surface of the rotating mass. The surface irregularities induce pressure changes in the ambient fluid which may then be sensed. The specific embodiment disclosed relates to a gyroscopic rotor formed by joining hemispheres of differing diameters. Upon rotation about an axis not having as an equator the discontinuity formed by the joint, the discontinuity induces pressure variations which are sensed by fluidic pickoffs spaced about the rotating mass. The output of each pickoff is a pulse width modulated signal whose duty cycle is used to determine the position of the axis of rotation of the mass.

7 Claims, 6 Drawing Figures

PATENTED JUN 27 1972    3,672,235

INVENTOR:
CARL G. RINGWALL,
by
HIS ATTORNEY

FLUIDIC AXIS POSITION SENSOR FOR ROTATING MASS

This invention relates to a sensor for determining the position of the axis of rotation of a rotating mass. More particularly it relates to a system utilizing fluidic pickoffs for determining the position of the axis of rotation of a gyroscopic rotor.

Fluidic pickoff systems for the purpose have, up to now, a rather restricted angular range over which they operate, typically ±10°. Other types of sensing schemes, non-fluidic, are encumbered by additional equipment needed to convert the sensed signal into a useful output. For example, where optical sensors have been utilized, a source of light is necessary, along with the attendant power supply, mirrors, photocells, etc. Further, it is generally necessary to utilize a pulse shaper for the output of the photocells to obtain a uniform pulse.

In view of the above, it is an object of this invention to provide an axis of rotation position locator utilizing fluidic pickoffs and capable of operating over a wide angular range.

It is a further object of the present invention to provide an axis of rotation position sensor utilizing fluidic pickoffs whose output signal has sufficient definition to be utilized directly, without the use of interface or conversion equipment.

Another object of the present invention is to provide an axis of rotation position sensor utilizing fluidic pickoffs whose output is linear over a large portion of its operating range.

Yet a further object of the present invention is to provide an axis of rotation position sensor utilizing fluidic pickoffs and exerting negligible torques on the rotating mass whose axis of rotation is being sensed.

The foregoing objects are achieved in the present invention wherein there is provided a rotating mass, for example a spherical gyroscopic rotor, having an irregularity thereon, for example a discontinuity along any great circle not an equator. Such a discontinuity can be obtained by joining hemispheres of slightly different diameters. Fluidic pickoffs placed around and adjacent to the rotating mass sense the pressure variations induced by the surface irregularities on the mass. If the mass is the above-noted sphere, the output of the sensors comprises pulse width modulated waves whose duty cycle, i.e., the percent "ON" time of the period is indicative of the position of the axis of rotation.

In some applications, the pulse width modulated output may be utilized directly. For example, where the rotating mass is a gyroscopic rotor in a missile guidance system, the pulse width modulated output signals can be amplified and used to directly modulate the steering thrusters of the missile.

A more detailed understanding of the present invention may be obtained by considering the following description in conjunction with the attached drawings in which.

Figure 1:
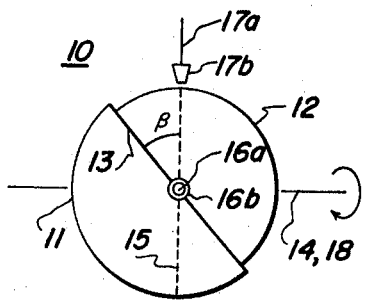
FIG. 1 illustrates one position of the rotating mass modified in accordance with the present invention.
Figure 2:
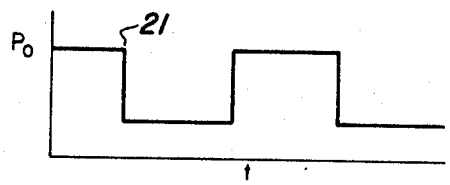
FIG. 2 illustrates the output waveform from one of the fluidic pickoffs.

In FIG. 1 there is illustrated a rotating mass 10 having the particular form of a sphere comprising a first hemisphere portion 11 and a second hemisphere portion 12 joined together along a great circle 13. As shown in FIG. 1, the spherical mass 10 rotates in an ambient fluid about its axis of rotation 14 and has defined around it yaw, pitch, and roll axes 16, 17, and 18, respectively. It is understood, of course, that these names are used in their ordinary sense, i.e., they refer to the three mutually perpendicular axes used to define three dimensional space. The axes chosen are for convenience only since non-orthogonal axes while usable, would increase the calculations necessary for determining the position of the axis of rotation of the spherical mass. As illustrated in FIG. 1, the axis of rotation 14 and the roll axis 18 are colinear, the spherical mass 10 has an equator 15 as the great circle perpendicular to the axis of rotation, and the great circle defining the joint between the hemispheres 13 is inclined at an angle $\beta$ to the equator 15. In the example given in FIG. 1 of a particular position for the axis of rotation, fluidic pickoffs 16b and 17b are positioned adjacent to the spherical mass along the yaw and pitch axes, respectively, and sense the pressure changes induced by the change in radius of the spherical mass. The gap between the fluidic pickoff and the rotating mass controls the pressure level sensed by the fluidic pickoff. A large gap induces a low level signal and a small gap induces a high level signal. With the positioning as illustrated in FIG. 1, both the pitch and yaw axis pickoffs sense equal duration high level and low level signals. The output waveform from one of these fluidic pickoffs, for example the pitch axis pickoff, is illustrated in FIG. 2 by the curve 21. As can be seen from FIG. 2, the curve 21 has a 50 percent duty cycle, that is, the high level signal exists for one-half the period and the low level signal exists for the other half. Thus a 50 percent duty cycle signal from both the fluidic pickoffs would indicate that a rotating spherical mass 10 has its axis of rotation along the arbitrarily defined roll axis.

Figure 3:
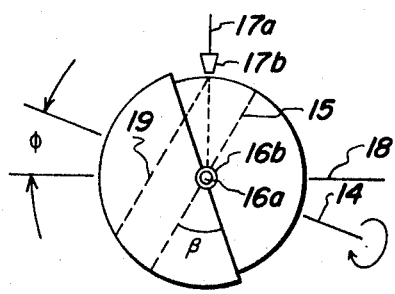
FIG. 3 illustrates a second position of the rotating mass modified in accordance with the present invention.

In FIG. 3 there is illustrated a rotating spherical mass having its axis of rotation displaced an angle $\phi$ in the plane containing the roll and yaw axes, that is, the axis of rotation is rotated about the pitch axis. In so doing, the fluidic pickoff along the pitch axis 17 no longer senses the pressure variations along the great circle; rather, it senses the pressure variations along a particular latitude illustrated by dotted line 19. The amount of latitude displacement is, of course, the same as the angular rotation of the axis of rotation about the pitch axis. When the fluidic pickoff along the pitch axis 17 is so displaced, the high level and low level output signals will no longer be of equal duration; rather, as illustrated in FIG. 4, the low level pressure signal will be much shorter than the high level pressure signal since much less of the low level pressure area is passing under the fluidic pickoff.

Figure 4:
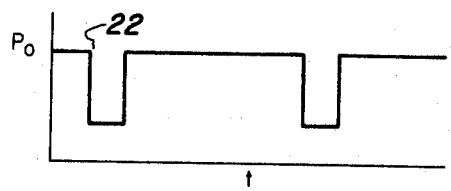
FIG. 4 illustrates the output waveform from one of the fluidic pickoffs located adjacent to the rotating mass.

In FIG. 4 there is illustrated the output signal from the fluidic pickoff along the pitch axis 17. As can be seen from curve 22, the low level signal has been shortened. The output signal of the yaw axis fluidic pickoff will be the same as that illustrated on curve 21 in FIG. 2. This is because the yaw axis fluidic pickoff is still sensing the pressure variations along a great circle. If the axis of rotation had been displaced out of the roll-pitch plane, then there would also be a variation in the duty cycle of the output signal from the yaw axis pickoff.

Figure 5:
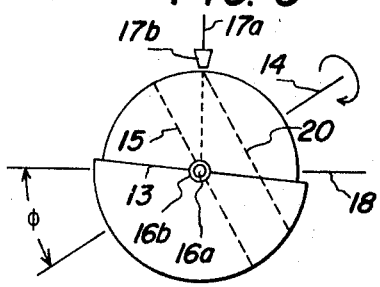
FIG. 5 illustrates another position of the rotating mass modified in accordance with the present invention.
Figure 6:
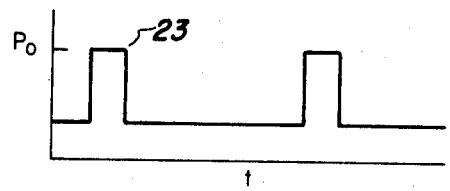
FIG. 6 illustrates the output waveform from a fluidic pickoff position adjacent the rotating mass.

FIG. 5 illustrates another position of the rotating mass 10 in which the axis of rotation has been displaced in the opposite direction in the roll-pitch plane from that illustrated in FIG. 3. As can be seen from FIG. 5 the pitch axis fluidic pickoff 17b is now displaced in the opposite direction and senses the pressure variations along a degree of latitude in which the low level pressure areas are much greater than the high level pressure areas. The output signal from the pitch axis fluidic pickoff is illustrated in FIG. 6 by the curve 23. As can be seen from the curve 23, the high level signal duration has been greatly reduced and the duty cycle of the output waveform is much lower than that of either FIGS. 2 or 4. Again, as with FIG. 3, the yaw axis fluidic pickoff 16b will continue to sense equal duration high and low level pressures due to the fact that is is still sensing pressure variations along a great circle. If the axis of rotation 14 had been displaced out of the roll-pitch plane, then the duty cycle of the signal sensed by the yaw axis fluidic pickoff would also be changed.

For each fluidic pickoff output signal the ratio of the low level signal duration ($t$) to the period of rotation ($T$) of the sphere is given by the following equation, from which the axis of rotation position may be calculated by any suitable means:

$$\frac{t}{T} = \frac{1}{2} - \frac{\cos^{-1}}{\phi}\left[\frac{\cos\phi\left(1-\frac{\sin^2\phi}{\sin^2\beta}\right)^{1/2}}{1-\sin^2\phi}\right]$$

Where $\phi$ is the spin axis displacement relative to the arbitrarily designated roll axis position, and $\beta$ is the angle of inclination between the equator and the great circle defining the discontinuity on the surface of the rotating mass.

Thus, it can be seen there has been provided an axis of rotation position sensor utilizing fluidic pickoffs capable of operation over a wide range of angular displacement. Where the rotating spherical mass is a gyroscopic rotor, the system of the present invention can be utilized as a means of guiding a vehicle by monitoring the changes in direction with the fluidic pickoffs. In certain applications such as missile steering, the pulse width modulated signal obtained by the fluidic pickoffs can be amplified and used directly to modulate the steering thrusters of the missile. This eliminates the need for including pulse width modulation circuits between conventional gyroscopic pickoffs and the steering thrusters.

While a specific embodiment of the present invention has been disclosed, it will be obvious to those of ordinary skill in the art that various modifications can be made without departing from the spirit and scope of the present invention. For example, in a guidance system more than one rotating spherical mass may be utilized or more than two axial pickoffs can be used with a single spherical mass or a combination of these two can be used thereby extending useful operating range of the over-all guidance system.

What I claim as new and desire to secure by Letters Patent of the United States is:

1. A fluidic axis of rotation position sensor comprising
   an ambient fluid,
   a mass rotating about an axis of rotation in said ambient fluid,
   said mass comprising a first portion having a first radius and a second portion having a radius greater than said first radius of said first portion,
   a discontinuity on the surface of said mass created by the differing radii of said first and second portions of said rotating mass, and
   at lease two, coplanar, mutually perpendicular, fluidic pickoffs adjacent said rotating mass whereby said pickoffs sense pressure variations in said ambient fluid caused by said discontinuity from which the position of said axis of rotation may be determined.

2. A fluidic axis of rotation position sensor as set forth in claim 1 wherein said rotating mass is spherical.

3. A fluidic axis of rotation position sensor as set forth in claim 2 wherein said discontinuity is along a great circle on said spherical mass.

4. A fluidic axis of rotation position sensor comprising
   an ambient fluid,
   a spherical mass rotating about an axis of rotation in said ambient fluid,
   said spherical mass comprising two hemispheres of different radii joined together,
   a discontinuity on the surface of said spherical mass, and
   at least two, coplanar, mutually perpendicular fluid pickoffs adjacent said rotating spherical mass whereby said pickoffs sense pressure variations in said ambient fluid caused by said discontinuity from which the position of said axis of rotation may be determined.

5. A fluidic axis of rotation position sensor as set forth in claim 4 wherein the portion of the spherical mass of smaller radius induces a low level output signal and the portion of the spherical mass of larger radius induces a higher level output signal and wherein the ratio of low level signal duration ($t$), to the period of rotation (T) is given by:

$$\frac{t}{T} = \frac{1}{2} - \frac{\cos^{-1}}{\phi}\left[\frac{\cos\phi\left(1-\frac{\sin^2\phi}{\sin^2\beta}\right)^{1/2}}{1-\sin^2\phi}\right]$$

where $\phi$ is the axis of rotation displacement relative to an arbitrary zero position and $\beta$ is the angle of inclination between the equator and the great circle defining the discontinuity on the sphere.

6. A fluidic axis of rotation position sensor as set forth in claim 5 wherein said spherical mass acts as a gyroscopic rotor and further comprising
   control means directly activated by said output signals whereby a vehicle containing said gyroscopic rotor can be guided.

7. A fluidic axis of rotation position sensor as set forth in claim 5 further including means for calculating $\phi$ from said ratio.

* * * * *